Dec. 15, 1942.  R. E. J. NORDQUIST  2,304,843
CONVEYER MECHANISM
Filed Nov. 18, 1939  2 Sheets—Sheet 1
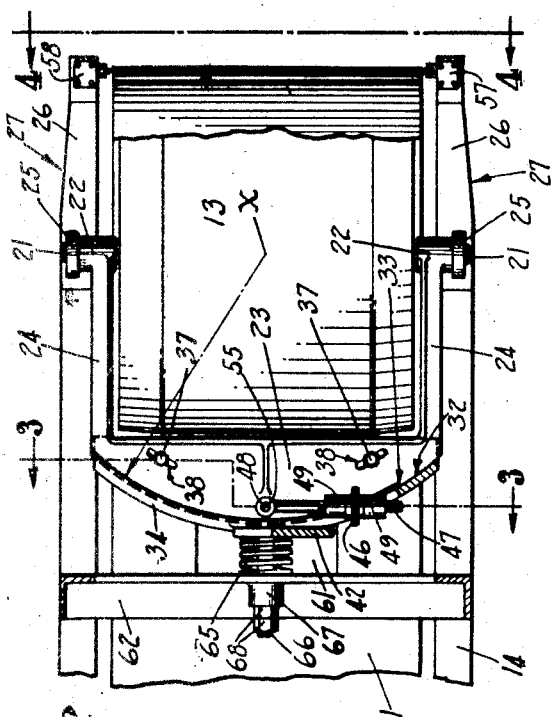
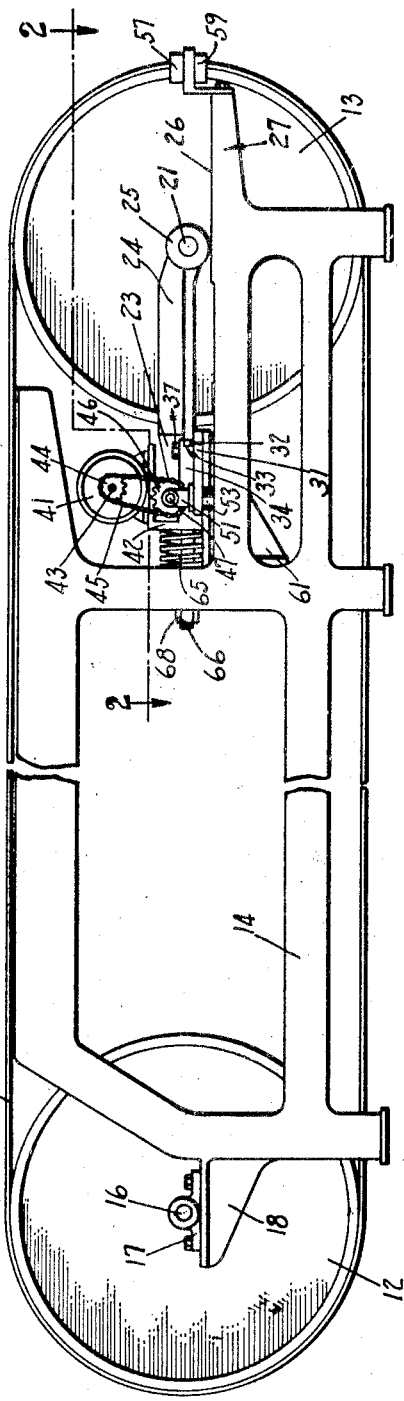
INVENTOR
Ronald E. J. Nordquist
BY
ATTORNEYS

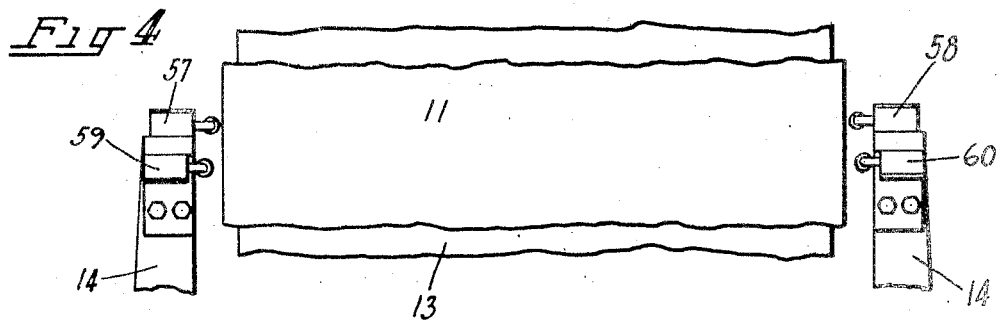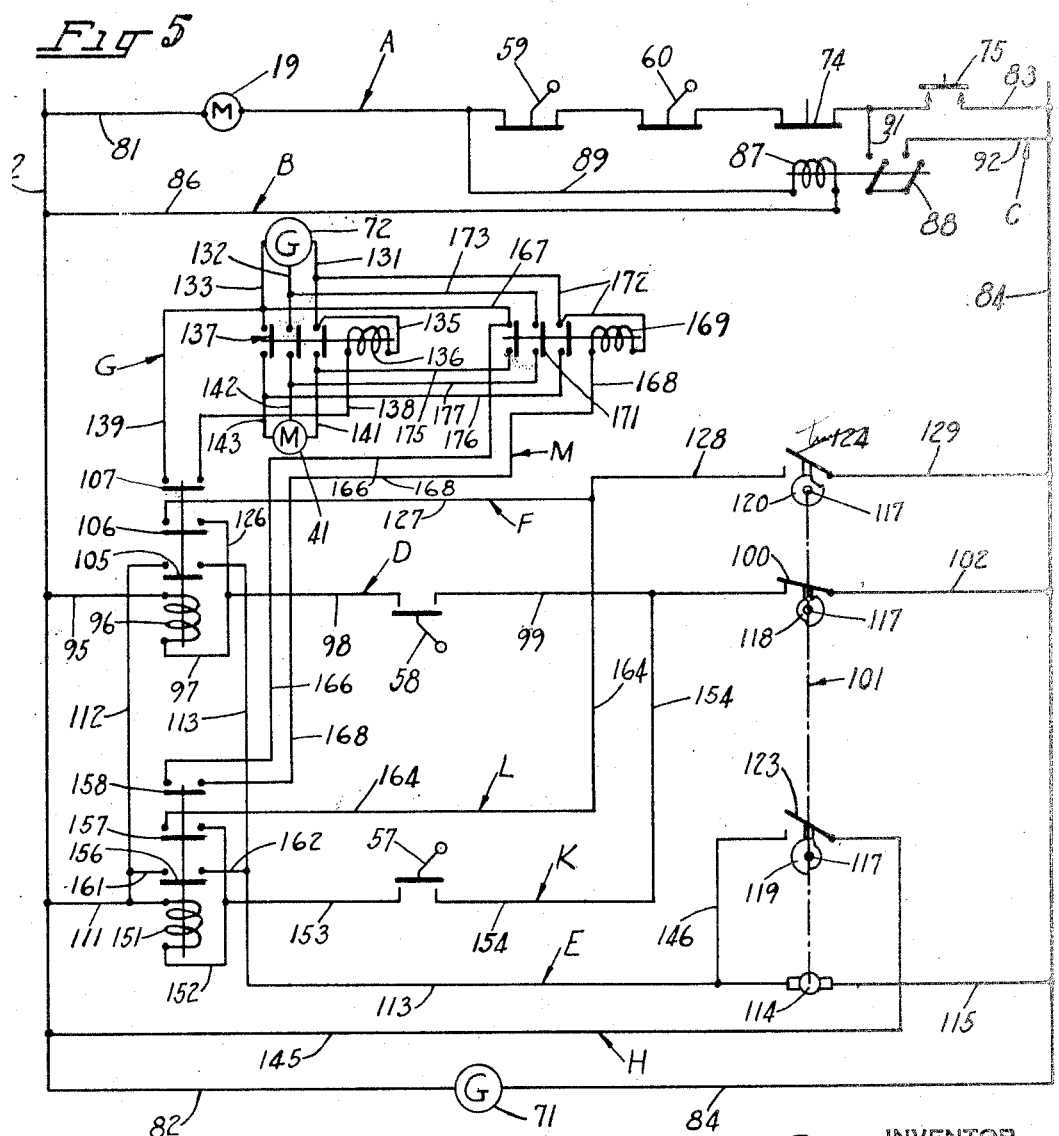

Patented Dec. 15, 1942

2,304,843

UNITED STATES PATENT OFFICE 2,304,843

CONVEYER MECHANISM

Ronald E. J. Nordquist, Maplewood, N. J., assignor to American Can Company, New York, N. Y., a corporation of New Jersey Application November 18, 1939, Serial No. 305,182

9 Claims. (Cl. 74—241)

The present invention relates to a belt conveyer mechanism or the like and has particular reference to devices for keeping the conveyer in a centralized position on the pulleys over which it passes.

An object of the invention is the provision in a conveyer mechanism of devices which function to keep the conveyer in a straight running path of travel and to prevent it from veering off to a side of the pulleys which it takes over and is particularly applicable to wide belt conveyers.

Another object is the provision in a conveyer mechanism of this character of a control for preventing side shifting or running off of the conveyer and includes electro-mechanical devices operable by a slight deviation of the conveyer from its proper path of travel.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a conveyer mechanism embodying the instant invention, with parts broken away;

Fig. 2 is a horizontal section taken substantially along the broken line 2—2 in Fig. 1; with parts broken away;

Fig. 3 is an enlarged vertical transverse section taken substantially along the broken line 3—3 in Fig. 2, parts being broken away;

Fig. 4 is an enlarged fragmentary front view taken substantially along a vertical plane indicated by the line 4—4 in Fig. 2; and Fig. 5 is a wiring diagram of the electric apparatus used with the mechanism.

To exemplify a preferred form of the instant invention, the drawings illustrate the principal parts of an endless belt conveyer of a character which is in general used in many commercial installations where articles, during manufacture, are conveyed over comparatively long distances within buildings. Such a conveyer preferably includes a metallic belt which is set up to carry sheets of tinplate from which cans or containers are produced. The belt is preferably wider than the sheets so that no portions of the latter extend over the edges of the conveyer. For such a use the conveyer will usually run approximately thirty six inches or over in width and it is this great width together with the metallic properties of the belt which gives it a tendency to run off to one side of the pulleys over which it passes.

As an example of such a conveyer, the drawings illustrate a stainless steel endless conveyer belt 11 (Fig. 1) which takes over a driving pulley 12 and over an idler pulley 13 which are mounted in a main frame 14. The driving pulley 12 is carried on a driving shaft 16 which is journaled in bearing blocks 17 secured to brackets 18 which are formed on the main frame 14. The driving shaft may be rotated in any suitable manner, such as, by an electric motor indicated by numeral 19 in the wiring diagram of Fig. 5.

The idler pulley 13 is mounted in a manner which permits of changing the position of its axis so that the pulley may be shifted by swinging it through an arc relative to the frame 14 and this may create a pressure on one side or the other and effective along the edges of the conveyer to move it laterally and thus to keep it in a straight line path. For this purpose the idler pulley 13 is mounted on an idler shaft 21 which is carried in bearings 22 of a horizontal movable carriage or swivel yoke 23 having side arms 24 (see also Figs. 2 and 3). The ends of the idler shaft extend beyond the bearings 22 and carry rollers 25 which ride on smooth finished surfaces 26 formed on the tops of extending brackets 27 projecting out from the main frame 14.

The swivel yoke 23 is slidably mounted on a horizontal swivel plate 31 so that it may be shifted relative to the plate through an arc having its center, indicated by the letter X (Fig. 2), located midway of the breadth of the idler pulley 13 at its axis. For this purpose the swivel yoke is formed with an arcuate rear edge 32. This arcuate edge of the yoke operates in an arcuate groove 33 which is provided in an upright shoulder 34 formed on the swivel plate 31. The yoke is retained against vertical displacement by shouldered cap screws 37 which operate in slots 38 formed in the yoke. The screws extend through the yoke and are secured in the plate.

Movement of yoke 23 relative to the swivel plate 31 is effected by a reversible electric motor 41 which is actuated in a manner which will be hereinafter explained in connection with the wiring diagram in Fig. 5. The motor is secured to a bracket 42 which is formed as a part of the swivel plate. The motor shaft, indicated by the numeral 43, carries a sprocket 44 which drives an endless chain 45. The chain also takes over a sprocket 46 which turns on the threaded shank 47 of an eye bolt 48. The shank of the eye bolt is loosely carried in bearings 49 of a bifurcated swivel bracket 51 having a depending stem 52 which is pivotally secured in a lug 53 of the swivel plate 31. The head end of the eye bolt 48 is retained on a pivot pin 55 which is threaded into the swivel yoke 23.

Hence when the motor rotates, it revolves the sprocket 46 on the eye bolt shank 47 and this rotation shifts the bolt sidewise in its bearings 49. Such a shifting movement of the eye bolt slides the swivel yoke 23 in an arc on the swivel plate 31, said yoke being controlled in its arcuate floating movement by its engagement with the upstanding shoulder 34 on the swivel plate 31, as best seen in Fig. 2. The turning of the yoke thus shifts the idler pulley 13 and its axis and brings pressure on the adjacent edge, which may be designated the running-off edge, of the conveyer. Hence, such shift in the axis position of the pulley tends to bring the conveyer belt back into a centralized location on the pulley.

The motor being reversible in character makes it possible to slide the swivel yoke in either of two sidewise directions so that the pulley can be likewise shifted. Thus a correcting pressure may be exerted on either edge of the conveyer for returning it from either side to its central running position on the pulleys.

To make such a correction on the proper side of the conveyer, the motor is controlled by a pair of normally open electric limit switches 57, 58 (Fig. 2) which are secured to the frame extension brackets 27, one on each side of the conveyer adjacent its outer edges. A pair of normally closed stop switches 59, 60 (Fig. 4) are also disposed adjacent the limit switches for stopping the conveyer motor 19 in case the conveyer runs too far off the pulley 13. The operation of these switches will be explained hereinafter in connection with the wiring diagram.

Provision is made for maintaining the conveyer in a taut condition at all times. For this purpose the swivel plate 31 is movably carried on a support bracket 61 (Fig. 3) which is secured to a cross beam 62 of the frame 14. The swivel plate is formed with a depending tongue 63 which operates in a longitudinal slideway 64 provided in the top of the bracket. Hence the swivel plate and the machine parts carried thereon may be shifted longitudinally of the machine so that the idler pulley 13 may be forced back against the conveyer and this pulls the conveyer taut.

The pulley is maintained in this outward taut belt position by a compression spring 65 (Figs. 1 and 2) which is interposed between the motor bracket 42 of the swivel plate 31 and the cross beam 62 of the frame. A bolt 66 which is surrounded by the spring is provided to restrict the outward movement of the swivel plate in case the conveyer should break or to hold the pulley when the conveyer is not in place. The inner end of the bolt is secured in the swivel plate while the opposite or outer end extends through a boss 67 formed in the cross beam 62. Locknuts 68 are provided on the outer end of the bolt to limit its spring pressed position.

Reference should now be had to the wiring diagram in Fig. 5. Electric energy for operating the machine motor 19 and for the various control circuits is preferably supplied from a generator 71 whereas the energy for operating the conveyer correcting motor 41 is preferably supplied from a separate source of energy such as a generator 72.

When starting the machine from a standstill a starting circuit A is used which circuit includes the motor 19, the two normally closed stop switches 59, 60, a manually operated and normally closed stop switch 74, and a similar normally open start switch 75. These devices are all connected in series by suitable wires. At one end of this series of connected devices the motor 19 is connected by a wire 81 to a main lead wire 82 which connects with one side of the generator 71. At the other end of the series of devices the start switch 75 is connected by a wire 83 to a main return wire 84 which connects with the other side of the generator 71.

Hence when the press button starting switch 75 is momentarily closed the energy from the generator 71 travels along the lead wire 82, wire 81, the motor 19 and the series of switches 59, 60, 74, 75 connected thereto, the wire 83, and returns to the generator by way of the return wire 84. This excites the motor 19 and thus sets the machine in operation.

A holding circuit B is provided to maintain the motor 19 in operation after the press button starting switch is released or opened. This holding circuit includes a wire 86 which connects with one side of a solenoid 87 of a relay switch 88. The other side of the solenoid is connected by a wire 89 to the wire which connects the motor 19 to the stop switch 59. Energy traveling along the holding circuit while the start switch 75 is still closed energizes the solenoid 87 and thus closes the relay switch 88.

Closing of the relay switch 88 establishes a machine operating circuit C of which the holding circuit is a part and which cuts out the starting switch 75. Establishment of this circuit permits the motor 19 to continue in operation after the starting switch is released or opened. This circuit includes a wire 91 which connects one side of the switch 88 to the wire between the stop switch 74 and the start switch 75. The other side of the switch 88 is connected by a wire 92 to the return lead wire 84. Hence while switch 88 is closed, energy passing through the motor 19 and the stop switches 59, 60, 74, is returned to the generator by way of wire 91, switch 88, wire 92, and return wire 84.

Manual stopping of the machine when desired after it has once been started may be effected by opening the stop switch 74. This breaks the holding circuit B and the operating circuit C just described and thus stops the motor 19. The machine is also stopped when the conveyer runs off too far on either side of the pulley. When this happens the conveyer belt edge engages and opens one or the other of the stop switches 59, 60. Opening of either of these switches also breaks the holding circuit and the operating circuit and hence stops the motor 19.

Correction of the conveyer through the limit switches 57, 58 when it tends to run off to one side or the other of the pulley is brought about by certain circuits which are established and broken in timed sequence and over predetermined periods in order to allow time for an adjustment to become effective before another adjustment is made. An explanation of such circuits is best brought out by assuming the conveyer to be running off in a given direction, as for example, to the right as viewed in Fig. 4. The edge of the conveyer will then engage and close the normally open limit switch 58.

The limit switch 58 is included in an energizing circuit D which comprises a wire 95 which connects one side of a solenoid relay 96 to the main lead wire 82 of generator 71. The other side of the solenoid is connected by wires 97, 98 to the limit switch 58. The limit switch is also connected by a wire 99 to a normally closed cam operated timing switch 100 of a timing device 101. The timing switch is also connected by a wire 102 to the return lead wire 84 of generator 71. Hence when the limit switch 58 is closed energy from the generator 71 travels along this energizing circuit D and energizes the solenoid relay 96. Energizing of the solenoid relay 96 closes three switches 105, 106 and 107.

A correction motor circuit G is immediately established by closing of the switch 107. This sets into motion the reversible motor 41 in a direction which will swing the swivel yoke 23 so that the belt will be caused to move back and away from the switch 58 now being considered.

At the same time a timing circuit E is established by closing of the switch 105 and electrical energy thereupon sets into motion the timing device 101.

Closing of the switch 106 at this time does not result in immediate establishment of a circuit, but does prepare for what will later be a holding circuit F. This latter circuit will be established as the direct result of closing of a switch member in the timing device 101. The timing device operates through a definite time cycle which permits the yoke actuating motor 41 to operate an exact number of seconds. This timing device thereupon holds the yoke in its adjusted position a given number of seconds. This tends to give the conveyer belt time to make its adjustment on the pulley.

Following such holding of the yoke, further shifting may take place in the same direction if the belt has not moved far enough to release the switch 58. Where this happens the timing device 101 again operates to give another definite shifting movement followed by another rest period. This continues as long as the switch 58 remains closed.

Should the belt after any one of these adjustment periods have moved back far enough to release the switch 58, the timing device 101 will not be again operated by the timing circuit E passing through the switch 105.

However, should the belt following any of the aforesaid adjustment periods actuate the switch 57 on the other side, similar circuits will be established as just described, but in this case the motor 41 will be operated in reverse. This will be later more fully described.

The result of such control is that when the belt adjustments are being made the shifting of the yoke and the holding of the yoke after each shifting period take place during a definite time interval and this is determined by the timing device 101. The various switch elements of this timing device will be later described, but first the circuits E, F and G will be further explained.

The timing circuit E includes wires 111, 112 which connect the main lead wire 82 of generator 71 to the relay switch 105. The relay switch is also connected by a wire 113 to a timing motor 114 of the timing device 101. The timing motor is also connected by a wire 115 to the generator return wire 84. Hence electrical energy traveling along the circuit excites the timing motor 114 and sets the timing device 101 in operation immediately after the limit switch 58 has been closed by the lateral shifting or running off of the conveyer.

The timing device 101 includes a rotatable shaft 117 which is revolved by the timing motor 14 and which carries three cams 118, 119, 120. These cams respectively operate the switch 100 of the energizing circuit D and two other normally open timing switches 123, 124 of the respective circuits E and F, these switches being operated at predetermined times after the timing device is set in motion as will now be explained.

Setting in motion of the timing device 101 immediately closes the timing switch 124 of the holding circuit F and opens timing switch 100 of the energizing circuit D and thereby establishes the holding circuit. It is such opening of the timing switch 100 that breaks the energized circuit D and thereby renders the limit switch 58 ineffective for the following cycle of the timing device 101. This allows time for the yoke actuating motor 41 to be set in motion and to bring about a shifting of the pulley and an adjustment of the conveyer belt. In such holding circuit F energy from generator 71, traveling through the solenoid relay 96, then continues along wire 97, a wire 126, closed relay switch 106, wires 127, 128, closed timing switch 124, a wire 129, and return wire 84, back to the generator. The timing switch 124 remains closed for a predetermined length of time and is then opened by its rotating cam 120.

During the period that the timing switch 124 is closed the correction motor circuit G established by the closing of switch 107, functions to excite the correction motor 41 in the proper direction to bring about an adjustment of the conveyer belt as hereinbefore explained. The source of energy for this circuit G is supplied from the auxiliary generator 72 which is provided with three phase lead lines 131, 132, 133.

When switch 107 is closed the energy from the auxiliary generator 72 travels along lead line 131, a wire 135, a solenoid 136 of a relay switch 137, wire 138, switch 107, a wire 139 returning by way of wire 133 to the generator. This current energizes the solenoid 136 and thus closes the relay switch 137.

Closing of the relay switch 137 connects the auxiliary generator lead wires 131, 132, 133 with motor lead wires 141, 142, 143 which extend directly to the correction motor 41. Hence energy from the generator is conducted direct into the motor. This connection is maintained for only a short time, preferably only a few turns of the motor, and is then broken to permit the adjustment thus made on the conveyer to become effective.

Breaking of the correction motor circuit G is brought about when the timing switch 124 opens as hereinbefore mentioned. The opening of this switch also breaks the holding circuit F and hence permits the switches 105, 106, 107 to open. This action breaks the other remaining circuits so that the entire system will be in readiness for a further adjustment of the conveyer when such is necessary.

The results of such an adjustment are not immediately effective, hence provision is made for delaying further adjustment until a predetermined period of time has lapsed so that the conveyer belt will have time to locate itself on the newly adjusted pulley. This delay is brought about by the timing device 101 which is kept in operation through a delay circuit H which is established by the closing of timing switch 123 by its cam 119 just prior to the breaking of the holding circuit F.

When timing switch 123 is closed, energy from the generator 71 travels from the lead wire 82, along a wire 145, through timing switch 123, a wire 146, wires 113, 115, 84 by way of the timing motor 114 and back to the generator. Such a closed circuit keeps the timing motor in operation. When the cam 119 opens the switch 123 and thus cuts off the source of energy the timing motor stops.

Just prior to stopping of the timing motor, however, the timing cam 118 closes the timing switch 100 of the energizing circuit D. The cam operated timing switches 123, 124 are both left open while switch 100 is left closed. This completes the entire cycle of the timing device and the system of circuits are again ready for a subsequent adjustment of the correction motor 41.

The description of the wiring diagram thus far has taken into account only those circuits which are required to turn the reversible correction motor 41 in the proper direction when the conveyer tends to run off toward the right in Fig. 4. A similar set of circuits are provided to turn the motor 41 in the opposite direction when the conveyer tends to run off toward the left in Fig. 4. At that time the conveyer operates the limit switch 57.

The limit switch 57 is included in an energizing circuit K which is identical with the energizing circuit D and is severed by the same timing switch 100. When the limit switch 57 is closed this circuit receives its electrical energy from the generator 71, along the wire 111, the current passing through a solenoid relay 151, wires 152, 153, switch 57 and a wire 154 which connects into the wire 99 of the circuit D. This energizes the solenoid relay 151 and thus closes three other switches 156, 157, 158.

Switch 156 is connected by wires 161, 162 to the respective wires 112, 113 of the timing circuit E so that the timing device 101 will be set in motion when the switch 156 is closed. Switch 157 is connected on one side to the wire 153 of the energizing circuit K and on the other side by a wire 164 which connects with the wire 127 of the holding circuit F. Hence the closing of switch 157 establishes a holding circuit L which is identical with the holding circuit F and which maintains the solenoid relay 151 energized when the limit switch 57 and the timing switch 100 are closed.

Switch 158 is connected on one side by wires 166, 167 to the lead wire 133 of the auxiliary generator 72. The other side of the switch is connected by a wire 168 to a solenoid 169 of a relay switch 171. The solenoid is also connected by a wire 172 to the lead wire 131 of the auxiliary generator. Hence the closing of switch 158 establishes a correcting motor circuit M which is identical to the motor circuit G and which energizes the solenoid 169 and thereby closes the relay 171. Closing of the relay causes the current to travel from the auxiliary generator 72 along the wires 167, 172 and a third wire 173, directly into the correcting motor 41 by way of connecting lead wires 175, 176, 177.

The periods of operation and the breaking of these circuits K, L and M are the same as for the circuits D, F and G and are controlled in the same manner by the timing device 101. It is therefore thought that the detailed operation of the timing device in connection with these circuits can here be omitted for the sake of brevity.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A control device for maintaining proper running alignment of a conveyer belt on its pulleys, comprising in combination with such conveyer belt, a swivel yoke for supporting one of said conveyer pulleys, said yoke having a curved wall, a swivel plate for movably holding said swivel yoke and its supported pulley and having a curved seat engaging the curved wall of said yoke, a threaded eye bolt engaging said swivel yoke and adapted to exert pressure on the same for shifting said yoke with its pulley from one side to the other by sliding engagement with said curved support, a sprocket carried on said threaded eye bolt and movable thereon to effect such shifting, a reversible electric motor geared to and adapted to rotate said sprocket to cause said pulley to exert an edge pressure on one side of said belt, and electrical means engageable with said conveyer belt and operable when the conveyer belt veers to one side of its regular path of travel for actuating said motor to rotate said sprocket in a direction to apply said pulley edge pressure to the proper side of the belt to return the belt to its centralized running position on said pulleys, said electrical means being in electrical circuit with said reversible motor.

2. A control device for maintaining proper running alignment of a conveyer belt on its pulleys, comprising in combination with such a conveyer belt, a support carriage for one of the conveyer pulleys said carriage being movable through an arc having its axis disposed substantially centrally of the longitudinal axis of said pulley, a main electric motor for actuating said conveyer, an auxiliary reversible electric motor for moving said carriage in either direction, a pair of electric detector switches disposed adjacent the path of travel and on opposite sides of the conveyer belt, a said switch being engaged by said belt when the belt veers from its central running position and moves toward that side, means electrically connected between each of said switches and said auxiliary motor for selectively actuating the motor in a direction to properly shift the said carriage to exert an edge pressure on said belt to return the belt to its centralized running position on said pulleys, a pair of stop switches disposed adjacent the path and on opposite sides of travel of the conveyer belt, said stop switches being located outside of said detector switches, a said stop switch being engaged by said belt if the latter moves too far out of its central position on that side, and a switch controlled holding circuit in electrical circuit with a said stop switch and said main electric motor for terminating operation of the motor and for stopping the conveyer when said stop switch is actuated.

3. A control device for maintaining proper running alignment of a conveyer belt on its pulleys, comprising in combination with such a conveyer belt, a movable support carriage for one of the conveyer pulleys, an auxiliary electric motor for moving said carriage and its supported pulley to one side or the other, a pair of electric detector switches located one on each side of said belt, each switch being adapted to establish an electric circuit between the switch and said motor when the belt moves from its central running position and engages such a switch, said switches being adapted to actuate said motor in opposite directions to move said carriage and its supported pulley on an axis disposed substantially centrally of the longitudinal axis of said pulley, whereby to exert pressure on said belt to return the same to its centralized running position on said pulleys, and a timing device disposed in electrical circuit with said switch circuit for delaying said motor actuation to permit an adjustment to become effective before a subsequent adjustment is made.

4. A control device for maintaining proper running alignment of a conveyer belt on its pulleys, comprising in combination with said conveyer belt, a support, a carriage having sliding movement on said support and in which one of the conveyer pulleys is journaled, means on said support engaging an edge portion of said carriage for guiding the same in an arcuate path of travel, and electrically controlled means actuated by and operable when the conveyer belt veers to one side of its regular path of travel for slidably shifting said carriage and its pulley relative to said support through said arcuate path of travel on an axis disposed substantially centrally of the longitudinal axis of said pulley, whereby said supported pulley exerts an edge pressure on said belt to return the same to its centralized running position on said pulleys.

5. A control device for maintaining proper running alignment of a conveyer belt on its pulleys, comprising in combination with said conveyer belt, a support, a carriage having sliding movement on said support and in which one of the conveyer pulleys is journaled, means on said support engaging an edge portion of said carriage for guiding the same in an arcuate path of travel, a detector element located at a side of said belt and engageable by an edge of the belt when the belt veers from its centralized running path, and electro-mechanical means in electrical circuit with and operable by said detector element when so engaged for slidably shifting said carriage and its pulley relative to said support through said arcuate path of travel on an axis disposed substantially centrally of the longitudinal axis of said pulley, whereby the pulley exerts an edge pressure on said belt to return the same to its centralized running position on said pulleys.

6. A control device for maintaining proper running alignment of a conveyer belt on its pulleys, comprising in combination with said conveyer belt, a support, a freely floating carriage movable on said support and in which one of the conveyer pulleys is journaled, means on said support engaging said carriage for guiding the same in an arcuate path of travel, means for holding said carriage under spring tension in a horizontal direction to maintain said belt in taut running condition while permitting movement of said carriage through an arcuate path of travel for varying the edge pressure on different sides of the belt, and means for bodily moving said carriage relative to said support along said arcuate path of travel and with it the pulley carried thereby when said belt veers from its centralized running path, so that edge pressure exerted on said belt serves to return it to its centralized running position on said pulleys.

7. A control device for maintaining proper running alignment of a conveyer belt on its pulleys, comprising in combination with said conveyer belt, a support plate, a swivel yoke member constituting a carriage mounting for one of the conveyer pulleys supported for free floating movement on said plate, an arcuate shoulder on said support plate engaging an arcuate portion of said yoke member for guiding the latter in an arcuate path of travel, said yoke member including horizontally spaced side arms in which said conveyer pulley is journaled, and means disposed adjacent and actuated by said belt and operable when the belt runs to one side of its central path of travel for bodily shifting said swivel yoke and its supported pulley on said plate through an arcuate path of travel, so that the pulley carried by said yoke exerts an edge pressure on said belt to return the same to its centralized running position on said pulleys.

8. A control device for maintaining proper running alignment of a conveyer belt on its pulleys, comprising in combination with said conveyer belt, a horizontally disposed freely floating swivel yoke for supporting one of said conveyer pulleys and having a curved wall portion, a horizontally disposed swivel plate for freely supporting said swivel yoke and having a curved seat disposed in engagement with said curved wall portion of said yoke, and means actuated by and operable when the conveyer belt veers to one side of its regular path of travel for bodily shifting said swivel yoke with its supported pulley relative to and upon said swivel plate by sliding engagement of the yoke with said curved plate seat, so that the said pulley exerts an edge pressure on said belt to return the same to its centralized running position on said pulleys.

9. A control device for maintaining proper running alignment of a conveyer belt on its pulleys, comprising in combination with such a conveyer belt, a support plate including an arcuate upstanding shoulder having a seating groove therein, a carriage in which one of the conveyer pulleys is journaled, said carriage having a curved portion seated within said groove and freely movable on said support plate through an arcuate path of travel on an axis disposed substantially centrally of the longitudinal axis of said pulley, a reversible electric motor for moving said carriage in opposite directions on said support plate through said arcuate path of travel, a pair of electric detector switches disposed adjacent the path of travel of the conveyer belt on opposite sides of the same, one of said switches being engaged by said belt when the belt veers from its central running position and moves toward that side, and independent electro-mechanical means electrically connected between each of said switches and said motor for selectively actuating the motor in a direction to properly shift the said carriage to exert an edge pressure on said belt to return the belt to its centralized running position on said pulleys.

RONALD E. J. NORDQUIST.